United States Patent [19]
Ashdown et al.

[11] Patent Number: 5,910,213
[45] Date of Patent: Jun. 8, 1999

[54] TREATED TITANIUM DIOXIDE

[75] Inventors: Steven Hugh Ashdown, Darlington; Robert McIntyre, Durham; Neil Martin Richmond, Darlington, all of United Kingdom

[73] Assignee: Tioxide Group Services Limited, London, United Kingdom

[21] Appl. No.: 08/903,981

[22] Filed: Jul. 31, 1997

[30] Foreign Application Priority Data

Aug. 15, 1996 [GB] United Kingdom .................... 9617163

[51] Int. Cl.$^6$ ................................. C09C 1/36; C09C 3/10
[52] U.S. Cl. .................... 106/436; 106/438; 106/439; 106/442; 106/443; 106/445; 106/446; 106/447; 106/448; 106/449
[58] Field of Search .................... 106/436, 438, 106/439, 442, 443, 445, 446, 447, 448, 449

[56] References Cited

U.S. PATENT DOCUMENTS

| 4,752,340 | 6/1988 | Brand et al. ............................ 106/448 |
| 4,935,063 | 6/1990 | Costanzi et al. ......................... 106/506 |
| 5,158,998 | 10/1992 | Neri et al. ................................. 524/96 |

FOREIGN PATENT DOCUMENTS

| 0263561 | 4/1988 | European Pat. Off. . |
| 0307054 | 3/1989 | European Pat. Off. . |
| 7310041 | 11/1995 | Japan . |

*Primary Examiner*—Anthony Green
*Attorney, Agent, or Firm*—Baker & Botts, L.L.P.

[57] ABSTRACT

A pigmentary material comprises particulate titanium dioxide the particles of which have been treated with a polymeric hindered amine stabiliser. The stabiliser is a polymer having a main chain substantially free of acidic groups and having hindered amine stabilising groups. The stabilising groups comprise at least 35 per cent by weight of the polymer. Preferably, the titanium dioxide particles are also treated with an organic compound such as a polyhydric alcohol, an alkanolamine, a polysiloxane or a fatty acid.

20 Claims, No Drawings

TREATED TITANIUM DIOXIDE

The invention relates to pigmentary titanium dioxide and particularly titanium dioxide which has been treated with a stabiliser.

Titanium dioxide is well known as an excellent white pigment. It is also well known that titanium dioxide can initiate photocatalytic degradation of polymeric compositions which contain it. Many means have been devised to reduce the effect of this degradation process but, nevertheless, there remains a need for a titanium dioxide pigment which is less prone to cause degradation.

It is an object of this invention to provide a titanium dioxide pigment which can be incorporated into a polymeric composition and which shows a reduced effect on the degradation of the composition.

According to the invention, a pigmentary material comprises a particulate titanium dioxide, the particles of which have been treated with a polymeric hindered amine stabiliser which comprises a polymer having a main chain substantially free of acidic groups and having stabilising groups, said stabilising groups being hindered amines and said stabilising groups comprising at least 35 per cent by weight of the polymer.

The particles of the titanium dioxide of the invention have been treated with the aforementioned hindered amine stabiliser. Generally, it is believed that the hindered amine stabiliser will be present as a coating on the surface of the pigment particles. However, any reference to such a coating herein does not necessarily imply that the particles are completely or coherently coated with the hindered amine stabiliser.

The titanium dioxide which is of use in forming the product of the invention is any form of titanium dioxide which is useful as a pigment. It can be prepared, for example, by the "sulphate" process or the "chloride" process and is normally in the anatase or rutile crystalline form. Preferably rutile titanium dioxide is used.

The treatment with hindered amine stabiliser is effective on titanium dioxide which is otherwise untreated but it is particularly effective when the particles of titanium dioxide are treated with inorganic compounds before they are treated with the stabiliser. Typically, the titanium dioxide is coated with an oxide or hydrated oxide of an element such as silicon, titanium, aluminium, zirconium, calcium, zinc, cerium, boron, magnesium or with a phosphate. The titanium dioxide is treated with these inorganic compounds by conventional methods used in the titanium dioxide pigment industry.

When such inorganic coatings are present, the amount present is preferably from 1 per cent to 10 per cent by weight calculated as oxide or $P_2O_5$ with respect to $TiO_2$. Preferably, the amount is from 2 to 8 per cent by weight with respect to $TiO_2$.

Hindered amine stabilisers are well known compounds which are frequently called hindered amine light stabilisers or HALS. They are characterised by a nitrogen atom which is hindered by neighbouring groups. Typically, derivatives of piperidine, pyrrolidine or morpholine are used as hindered amine stabilisers. The active, stabilising fragment of such molecules can be represented by the following formulae

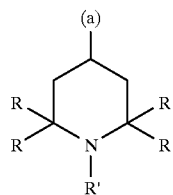

(I)

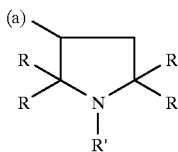

(II)

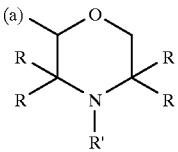

(III)

in which R represents an alkyl group and R' represents hydrogen, an alkyl group or an alkoxy group. In each of the above formulae, all four R groups are not necessarily identical.

The titanium dioxide according to the invention is treated with a polymeric hindered amine stabiliser which contains hindered amine groups. Polymers which contain groups such as (I), (II) and (III) above and in which the groups are attached to a polymer chain through a bond such as that marked (a) are suitable for use in the invention. Preferred embodiments of these stabilisers are those in which the group R is a short chain alkyl group such as a methyl or an ethyl group. Especially preferred are tetramethyl derivatives (i.e. each of the four R groups in any of the above formulae represents a methyl group). Preferably R' is hydrogen or methyl. Particularly preferred polymeric hindered amine stabilisers contain tetramethyl piperidino groups.

The polymer which can be used to form the main chain of the polymeric hindered amine stabiliser can be selected from a number of polymer types. For example, the backbone of the polymer may be substantially a hydrocarbon chain which may be derived from hydrocarbon monomers such as ethylene, propylene or styrene or from other ethylenically unsaturated monomers such as esters of acrylic acid or methacrylic acid or may be a copolymer based on such monomers. Alternatively the backbone polymer or copolymer may be a polyether (for example a polyoxyethylene polymer) or a polyurethane, polyester, polyurea, polyamine or polyamide. Polymeric backbones which comprise groups containing nitrogen are particularly suitable and especially polymers based on amine, amide and urea repeating units Other useful polymeric backbones contain symmetrical triazine entities as part of the repeating unit.

The polymer main chain is substantially free of acid groups. If any acid groups are present the acid number is usually less than 10 mg KOH per gram and preferably less than 5 mg KOH per gram.

The hindered amine stabiliser groups can be attached to the main polymer chain in any convenient manner. However, a particularly effective polymeric hindered amine stabiliser contains hindered amine stabiliser groups which are pendant to the main chain. For example, the polymer contains pendant groups such as those shown in (I), (II) or (III) above which are pendant to the main chain and attached through the bond marked (a). The precise nature of the attachment is not critical but one embodiment of the invention uses a polymeric hindered amine stabiliser which is prepared by the copolymerisation of 2,2,6,6-tetramethyl-4-acryloyl piperidine, or 2,2,6,6-tetramethyl-4-methacryloyl piperidine or a derivative of either of these piperidines with one or more ethylenically unsaturated monomers.

In other suitable polymeric stabilisers the hindered amine group may be directly attached to, for example, a nitrogen atom in the polymer backbone or may be attached by branch chains of a similar structure to the polymer backbone. For example when the polymer backbone contains amino and/or triazine groups, the hindered amine groups may be attached to the main chain by means of side chains containing amino and/or triazine groups.

The hindered amine stabiliser groups comprise at least 35 per cent by weight of the polymer. Preferably, these groups comprise at least 40 per cent by weight. The polymeric hindered amine stabiliser could comprise 100 per cent hindered amine stabiliser groups by preparing, for example, a homopolymer of an unsaturated hindered amine stabiliser such as 2,2,6,6-tetramethyl-4-acryloyl piperidine. Normally, however, the proportion of the polymer which consists of hindered amine stabiliser groups is less than 75 per cent by weight.

It is preferred that the molecular weight of the polymeric hindered amine stabiliser is in the range 1000 to 10000 and more preferably the molecular weight is in the range 2000 to 6000.

Generally, the pigmentary material of the invention is treated with up to 1.0 per cent by weight of the polymeric hindered amine stabiliser with respect to $TiO_2$ and, preferably, it is treated with from 0.02 to 0.25 per cent by weight with respect to $TiO_2$.

In one embodiment of the invention the titanium dioxide is treated with an organic compound in addition to the polymeric hindered amine stabiliser. Preferably, the titanium dioxide is treated with the organic material either after treatment with the hindered amine stabiliser or simultaneously therewith. Organic compounds which are useful for treatment of the titanium dioxide include those compounds which are conventionally used to treat titanium dioxide pigments such a polyhydric alcohols, alkanolamines, fatty acids, polysiloxanes and glycol ethers. Alkanolamines which are useful include monoisopropanolamine, aminomethylpropanol and triethanolamine and useful fatty acids include isostearic acid, stearic acid and lauric acid.

Treatment of the titanium dioxide with a polyhydric alcohol as well as a hindered amine stabiliser has been shown to enhance the stabilising effect of the hindered amine and particularly effective polyhydric alcohols include trimethylolpropane, trimethylolethane, neopentylglycol, and pentaerythritol.

When organic compounds other than the hindered amine are present they are usually present in an amount between 0.05 and 1.0 per cent by weight with respect to $TiO_2$. Preferably the amount is from 0.2 to 0.6 per cent by weight with respect to $TiO_2$.

The treatment of the titanium dioxide with the hindered amine stabiliser can be carried out in any convenient manner which produces a relatively uniform distribution of the stabiliser over the particles of titanium dioxide.

Usually, pigmentary titanium dioxide is subjected to a milling process as one of the finishing processes. This milling is often called micronising. The hindered amine stabiliser can be added to the titanium dioxide as the latter is fed to a microniser. The particles of titanium dioxide are treated with the stabiliser during the micronising process. The stabiliser may be added to the microniser feed as a solution in, for example, an alcohol such as methanol or ethanol and this is convenient where the polymeric stabiliser is a solid. However, it may also be added without prior dilution, especially when it is a liquid or is easily melted at the temperature normally achieved during micronising.

Alternatively, the titanium dioxide may be treated in a separate step using, for example, a mixer or tumbler, the hindered amine stabiliser being added in the form of a solution in a solvent or a dispersion in water to the titanium dioxide whilst the mixture is agitated. Subsequently, the treated titanium dioxide is usually dried to remove any solvent or water used.

An alternative treatment method utilises the aqueous slurry of titanium dioxide which is normally produced during formation of pigmentary titanium dioxide. For example, the pigment is normally coated with an inorganic oxide using a process utilising an aqueous slurry. After coating with inorganic oxide an aqueous dispersion or a solution of the hindered amine stabiliser is added to this pigment dispersion with stirring. The treated pigment is subsequently separated, dried and, if necessary, micronised using techniques well known in the pigment industry.

The pigmentary material of the invention can be used as a pigment in many organic systems such as paints and other coatings, inks and pigmented plastics compositions used for films, fibres and moulded products including masterbatch compositions.

The stabilising effect of the hindered amine is greater than the effect observed when titanium dioxide and a hindered amine stabiliser are separately added to a composition. This is believed to be due to the fact that the stabiliser is located on the surface of the titanium dioxide particles and can therefore act at the pigment-polymer interface which is believed to be where degradation due to exposure of the polymer to UV radiation and/or heat is initiated. Although the polymeric hindered amine stabilisers do not necessarily contain any groups capable of reacting with and anchoring to the pigment particle surface, they have nevertheless been shown to be strongly associated with the pigment. This association can be demonstrated by, for example, milling treated pigment with a solvent, such as methanol, for several hours and measuring the amount of hindered amine stabiliser which becomes dissolved in the solvent. Usually less than 10 per cent by weight of the stabiliser will dissolve after 4 hours, indicating a strong association.

The activity of the hindered amine stabiliser can be demonstrated by observing the electron spin resonance (ESR) spectrum which is produced by the nitroxyl radicals generated by oxidation of the hindered amine stabiliser on exposure to UV light. The ESR spectrum of products of the invention indicates that they are active stabilisers. Surprisingly, when the titanium dioxide is treated with an organic compound such as a polyhydric alcohol in addition to the polymeric hindered amine stabiliser, the ESR signal is markedly increased indicated enhanced activity.

The invention is illustrated by the following example(s).

EXAMPLE 1

A rutile titanium dioxide pigment was prepared by the sulphate route process and treated with a mixed zirconia/alumina coating at a level of 3% by weight on $TiO_2$. The pigment was washed to remove excess soluble salts and then dried.

A sample of this drier discharge was fed in to a steam microniser at a steam:pigment ratio of 2:1. A 30% by weight solution of a polymeric HALS (Uvasorb HA88, 3V Sigma) was fed on to the pigment entering the microniser, at a rate sufficient to provide a concentration of HALS on pigment of 0.22% by weight (as determined by carbon analysis). The discharge was collected and half was passed through the microniser again at a steam:pigment ratio of 2:1 without any further addition to provide final pigment A. The remainder was passed through with an addition of 0.37% by weight on pigment of the trihydric alcohol trimethylolpropane (from a 60% by weight solution in water) at a steam:pigment ratio of 2:1 to give final pigment B. A control pigment C was prepared by double pass steam micronising a further sample of drier discharge at a steam:pigment ratio of 2:1 per pass with 0.68% by weight on pigment of trimethylolpropane added before the first microniser pass.

A long-oil air-drying alkyd paint was prepared from the two HALS-treated pigments and the control pigment. 20 g of a 20% solution of an alkyd resin (Sobral P470) in white spirit was mixed with 46 g of the titanium dioxide and the mixture was ball-milled for 16 hours. 77 g of a 70% solution of Sobral P470 in white spirit, 4 g of white spirit, 5.04 g of a Cobalt drier (D218) and 0.55 g methyl ethyl ketone were added and the mixture mixed for 30 minutes by trundling. A control paint was also prepared containing pigment C and 0.2% HA88 added during the final 30 minute mix. The paints were applied to aluminium panels and dried for 24 hours. Opacity (contrast ratio) and colour measurements on the paints (Table 1) show that the HALS-treated pigments perform as well as the control.

TABLE 1

Opacity and Colour of Long-Oil Air-Drying Alkyd Paint

| Pigment | Opacity Contrast Ratio @ 20 m²/1 | Colour L* | b* |
|---|---|---|---|
| A | 94.6 | 96.4 | 2.7 |
| B | 94.5 | 96.4 | 2.6 |
| C | 94.6 | 96.5 | 2.6 |

The panels were exposed in a Microscal unit equipped with a 1000W mercury lamp. The panels were analysed over a 10 week period for their hydroperoxide content, by iodometry, (Table 2) and for carbonyl content, by Fourier Transform Infra-red Spectroscopy (Table 3).

TABLE 2

Hydroperoxide Analysis as a Function of UV Exposure

| Pigment | % HA88 on pigment | % HA88 added in paint | Hydroperoxide Level in Paint (mgl⁻¹) Time of Exposure (weeks) | | | | |
|---|---|---|---|---|---|---|---|
| | | | 0 | 2 | 4 | 6 | 10 |
| A | 0.22 | — | 29,500 | 4,000 | 400 | 460 | 80 |
| C | — | 0.2 | 30,000 | 2,500 | 2,000 | 1,000 | 640 |
| C | — | — | 25,000 | 2,800 | 2,100 | 1,400 | 680 |

TABLE 3

Carbonyl Analysis as a Function of UV Exposure

| Pigment | % HA88 on pigment | % HA88 added in paint | Carbonyl Index* Time of Exposure (weeks) | | | | | |
|---|---|---|---|---|---|---|---|---|
| | | | 0 | 2 | 4 | 6 | 8 | 10 |
| A | 0.22 | — | 0.857 | 0.884 | 0.918 | 0.921 | 0.938 | 0.946 |
| C | — | 0.2 | 0.886 | 0.992 | 0.982 | 0.993 | 0.993 | 1.000 |
| C | — | — | 0.904 | — | 0.982 | 1.007 | 1.007 | 1.000 |

*FTIR absorbance at 1780 cm⁻¹ relative to absorbance at 1750 cm⁻¹.

An acrylic full gloss emulsion paint was also prepared from the two HALS-treated pigments and the control and the opacity (contrast ratio) and colour measurement are given below in Table 4.

TABLE 4

Opacity and Colour of Full Gloss Acrylic Emulsion Paint

| Pigment | Opacity Contrast Ratio @ 20 m²/1 | Colour L* | b* | Gloss 60° |
|---|---|---|---|---|
| A | 93.8 | 97.5 | 1.1 | 79 |
| B | 93.8 | 97.5 | 1.2 | 78 |
| C | 93.8 | 97.5 | 1.2 | 79 |

Although the polymeric HALS is substantially present as the amine a small proportion was found to have been converted to the nitroxyl radical. The presence of this stable radical can easily be detected by electron spin resonance (ESR) spectroscopy. By comparing peak intensities for a known quantity of sample it is possible to determine the concentration of radicals. The pigments A, B and C were analysed by ESR and the results are given below in Table 5. They show the unexpected result that the presence of the polyhydric alcohol increases the concentration of nitroxyl radical.

TABLE 5

Radical Concentration from ESR

| Pigment | ESR Spin Count (relative to Pigment A) |
|---|---|
| A | 1.0 |
| B | 2.0 |
| C | 0.0 |

The pigments were subjected to a solvent wash to determine the level of extractable HALS polymer. 50 g of pigment were dispersed in 100 g of industrial ethanol. The slurries were then trundled in glass jars containing glass beads. Samples of slurry were removed after 15 minutes and 4 hours and centrifuged to separate the pigment from the solvent. ESR analysis of the dried pigment sediment and the supernatant solvent were carried out to determine the relative proportions of nitroxyl radical. The results in Table 6 show that less than 10% by weight of the initial level of nitroxide on the pigment is removed after 4 hours, indicating that the HALS polymer is substantially bound to the pigment surface.

TABLE 6

Percentage of Nitroxyl Radical Abstracted from the pigment surface by solvent washing

| Pigment | Wash Time (mins) | Percentage of Nitroxyl Removed by Solvent |
|---|---|---|
| A | 15 | 3.6 |
|   | 240 | 4.2 |
| B | 15 | 5.6 |
|   | 240 | 6.9 |

Acrylic paints were prepared using pigments A, B and C as follows. 25 g of a 20% solution of acrylic resin (Dynocryl H260) in xylene was mixed with 66 g of the titanium dioxide and ball-milled for 16 hours. Then, 15 g of a 60% solution of Dynocryl H260 was added and the mixture was mixed by trundling for 30 minutes followed by addition of a further 53.7 g of the 60% Dynocryl H260 in xylene and 30.5 g of a 65% solution of melamine formaldehyde resin (Dynomin MB 13) in xylene/butanol (4:1) and mixing by trundling for 30 minutes.

Paints containing pigments B and C were applied to glass panels and cured by stoving at 150° C. for 30 minutes. Colour was measured using a spectrophotometer and again after further periods of heating at 150° C. The results (Table 7) indicate that the pigment coated with the polymeric HALS and TMP shows a lower level of yellowing than the pigment coated with TMP alone.

TABLE 7

Thermal Yellowing of an Acrylic/MF Stoving Paint

| Pigment | Time under post-cure heating (hours) | Colour change during post-cure heating $\Delta b^*$ |
|---|---|---|
| B | 24 | 0.67 |
|   | 48 | 0.81 |
|   | 120 | 3.00 |
| C | 24 | 0.71 |
|   | 48 | 1.05 |
|   | 120 | 3.63 |

A control paint was also prepared containing pigment C and 0.2% HA88 added during the final 30 minute mix. Paints were then sprayed on to aluminium panels and stoved in an air oven at 150° C. for 30 minutes. The acrylic paint panels were exposed under the EMMAQUA-NTW (DSET Labs) test condition in Arizona, and 60° gloss measured at regular intervals. Results are given in Table 8.

TABLE 8

Gloss as a Function of UV Exposure under EMMAQUA-NTW Test Method

| Pigment | % HA88 on pigment | % HA88 added in paint | 60° Gloss* UV Exposure (MJm$^{-2}$) | | | | | | |
|---|---|---|---|---|---|---|---|---|---|
|  |  |  | 0 | 94 | 188 | 282 | 376 | 470 | 560 |
| A | 0.22 | — | 100 | 100.5 | 103.8 | 97.3 | 68.3 | 60.2 | 51.1 |
| C | — | 0.2 | 100 | 103.4 | 110.1 | 75.4 | 53.6 | 51.4 | 41.9 |
| C | — | — | 100 | 101.7 | 109.4 | 86.7 | 60 | 56.1 | 49.4 |

*Glosses normalised to 100% time zero gloss

EXAMPLE 2

A sulphate route rutile titanium dioxide pigment was prepared with a 4% mixed zirconia, alumina, silica coating. This was washed to remove excess soluble salts and spray-dried. The dried pigment was then steam micronised with 0.1% by weight of a polymeric HALS (Uvabsorb HA88) and 0.4% by weight of trimethylolpropane (TMP) added to the microniser feed from a mixed ethanol/water solution (50:50 by weight). The resultant pigment (D) was then used to prepare a polyethylene masterbatch as follows:

70% Polyethylene Masterbatch

Masterbatch was compounded using a Haake Rheocord 90 fitted with Banbury type rotors and contained:

Pigment: 59.5 g TiO$_2$

Polymer: 25.5 g Exxon LM2020 LDPE

A test sample of masterbatch was prepared by press polishing 1 mm samples at 130° C. and 20 tes. The colour (L*, a*, b*) of the samples was measured on HunterLab Colourquest and is shown in Table 9.

A filled PVC sample was prepared using a laboratory 2 roll mill by compounding 7.5 g pigment with 221.25 g flexible PVC (Corvic 571/102).

A test sample was prepared by hot pressing using a constant film thickness maker.

The contrast ratio was determined from reflectance over a standard white/black tile.

TABLE 9

| Pigment | Colour in PE Masterbatch | | Contrast Ratio in PVC |
|---|---|---|---|
|  | L* | b* |  |
| Tioxide TR92 | 97.6 | 1.7 | Std |
| Pigment D | 97.5 | 1.7 | Slightly superior |

EXAMPLE 3

A sulphate route rutile titanium dioxide pigment was prepared with a 4% mixed zirconia, alumina, silica coating. This was then washed to remove excess soluble salts and dried. The dried pigment was steam micronised in 20 kg batches with the addition of the HALS (Uvasorb HA88) by the following means. In all cases the HALS addition was accompanied by an addition of 0.4% trimethylol propane (TMP).

| Pigment | % HA88 by weight | Addition route |
|---|---|---|
| E | 0.2 | Ethanol solution (20% w/w HA88) containing TMP in 2:1 wt ratio on HA88, applied to microniser feed |
| F | 0.2 | Solution in ethanol/water (1:1 wt ratio) containing TMP and HA88 in 2:1 wt ratio and 20% w/w HA88 on ethanol, applied to microniser feed |
| G | 0.2 | HA88 applied as finely divided solid (as supplied) to microniser feed, together with aqueous TMP solution (66% w/w TMP) |
| H | 0.2 | Aqueous suspension of HA88 in TMP solution (66% w/w TMP on water), HA88 at 1:2 wt ratio on TMP, added at microniser feed |

A control pigment (1) was prepared by adding the aqueous TMP solution (66% w/w TMP) at microniser feed to give 0.4 w/w TMP on pigment.

The pigments were examined by ESR to determine whether any differences existed in nitroxide activity as a result of the various addition routes. Within the sensitivity of the spectrometer the spectra for pigments E, G and H were considered to be identical The normalised peak-to-peak signal intensity for all three pigments was also identical within experimental error.

The pigments (E–I) were tested in a standard water based gloss paint using Rohm & Haas AC507 acrylic emulsion and 20% TiO$_2$ volume concentration to determine any effect of HALS addition route on coating appearance. Results are given in Table 10.

TABLE 10

Opacity, Colour and Gloss of Acrylic Gloss Paint

| Pigment | Contrast Ratio @ 20 m$^2$/l | Colour L* | b* | 60° Gloss |
|---|---|---|---|---|
| E | 93.6 | 97.5 | 2.4 | 62 |
| F | 93.5 | 97.5 | 2.2 | 62 |
| G | 93.6 | 97.4 | 2.3 | 60 |
| H | 93.5 | 97.3 | 2.3 | 64 |
| I | 93.5 | 97.4 | 2.4 | 64 |

EXAMPLE 4

A sulphate route rutile titanium dioxide pigment was prepared with a 4% mixed zirconia, alumina, silica coating. This was then washed to remove excess soluble salts and dried. The dried pigment was steam micronised in 20 kg batches with the addition of 0.2% w/w on pigment of HALS (Uvasorb HA88) from a 20% w/w ethanol solution containing the appropriate level of trimethylol propane (TMP) as shown in Table 11. This solution was added to the microniser feed.

TABLE 11

| Pigment | % HA88 | % TMP |
|---|---|---|
| J | 0.2 | 0 |
| K | 0.2 | 0.1 |
| L | 0.2 | 0.2 |

These pigments together with pigment E were analysed by ESR to determine the magnitude of the nitroxide signal as a function of amount of the tri-hydric alcohol (TMP) present on the pigment surface with the HALS. The results in Table 12 below show that, as in Example 1, the presence of the TMP increases the nitroxide signal.

TABLE 12

Relative Nitroxide Level as a Function of TMP Level

| Pigment | % TMP (w/w on pigment) | ESR Spin Count (relative to J) |
|---|---|---|
| J | 0 | 1.0 |
| K | 0.1 | 3.0 |
| L | 0.2 | 3.2 |
| E | 0.4 | 2.7 |

EXAMPLE 5

A sulphate route rutile titanium dioxide pigment was prepared with a 5% mixed alumina, silica coating. This was then washed to remove excess soluble salts and dried. The dried pigment was steam micronised in 20 kg batches with the addition of 0.2% w/w on pigment of HALS, the HALS being added to the microniser feed from a 15% w/w ethanol solution. Three different polymeric HALS were used, each possessing a different proportion of stabilising groups in the molecule.

Each pigment together with a pigment treated with 0.4% by weight of trimethylolpropane was incorporated into an acrylic/MF paint as described in Example 1. The paints had the properties shown in Table 13.

The polymeric HALS compounds were Uvasorb HA88 from 3V Sigma, Chimassorb 944 from Ciba and Uvasorb 3346 from Cytec.

TABLE 13

| Pigment treatment | Colour L* | a* | b* | Gloss 20° | 60° |
|---|---|---|---|---|---|
| Trimethylolpropane | 97.23 | –1.13 | 1.89 | 76 | 84 |
| Chimassorb 944 | 97.36 | –1.08 | 1.90 | 74 | 85 |
| Uvasorb 3346 | 97.36 | –1.08 | 1.94 | 76 | 86 |
| Uvasorb HA88 | 97.41 | –1.09 | 1.89 | 77 | 87 |

We claim:

1. A pigmentary material comprising a particulate titanium dioxide, the particles of which have been treated with an effective stabilising amount of a polymeric hindered amine stabiliser which comprises a polymer having a main chain substantially free of acidic groups and having stabilising groups, said stabilising groups being hindered amines and said stabilising groups comprising at least 35 per cent by weight of the polymer.

2. A pigmentary material according to claim 1 in which the titanium dioxide is rutile titanium dioxide.

3. A pigmentary material according to claim 1 in which the particles of titanium dioxide are coated with an inorganic compound before being treated with the polymeric hindered amine stabiliser, said inorganic compound comprising a phosphate, an oxide or a hydrated oxide of an element, said element selected from the group consisting of silicon, titanium, aluminium, zirconium, calcium, zinc, cerium, boron and magnesium.

4. A pigmentary material according to claim 3 in which the inorganic compound is present in an amount in the range 1 to 10 per cent by weight calculated as $P_2O_5$ or as oxide with respect to $TiO_2$.

5. A pigmentary material according to claim 1 in which the stabilising groups are selected from the group consisting of piperidino, pyrrolidino and morpholino groups.

6. A pigmentary material according to claim 5 in which the stabilising groups are tetramethyl piperidino groups.

7. A pigmentary material according to claim 1 in which the polymeric hindered amine stabiliser contains a backbone which is a polymer or copolymer selected from the group consisting of hydrocarbons, polyethers, polyurethanes, polyesters, polyureas, polyamines and polyamides.

8. A pigmentary material according to claim 1 in which the polymeric hindered amine stabiliser contains a polymeric backbone which contains symmetrical triazine entities as part of a repeating unit.

9. A pigmentary material according to claim 1 in which the main chain of the polymer has an acid value less than 10 mg KOH per gram.

10. A pigmentary material according to claim 1 in which the polymeric hindered amine stabiliser is a copolymer of a monomer selected from the group consisting of 2,2,6,6-tetramethyl-4-acryloyl piperidine, 2,2,6,6-tetramethyl-4-methacryloyl piperidine and derivatives thereof with one or more ethylenically unsaturated monomers.

11. A pigmentary material according to claim 1 in which the stabilising groups are directly attached to nitrogen atoms in the main chain of the polymer.

12. A pigmentary material according to claim 1 in which the stabilising groups are attached to the main chain of the polymer by means of side chains containing amino or triazine groups.

13. A pigmentary material according to claim 1 in which the polymeric hindered amine stabiliser has a molecular weight in the range 1000 to 10000.

14. A pigmentary material according to claim 1 in which the polymeric hindered amine stabiliser is present in an amount up to 1.0 per cent by weight with respect to $TiO_2$.

15. A pigmentary material according to claim 1 in which the titanium dioxide is also treated with an organic compound selected from the group consisting of polyhydric alcohols, alkanolamines, fatty acids, polysiloxanes and glycol ethers in addition to the polymeric hindered amine stabiliser.

16. A pigmentary material according to claim 15 in which the organic compound is present in an amount between 0.05 and 1.0 per cent by weight with respect to $TiO_2$.

17. A process for preparing treated titanium dioxide comprising treating particulate titanium dioxide with an effective stabilising amount of a polymeric hindered amine stabiliser which comprises a polymer having a main chain substantially free of acidic groups and having stabilising groups, said stabilising groups being hindered amines and said stabilising groups comprising at least 35 per cent by weight of the polymer.

18. A process according to claim 17 in which the polymeric hindered amine stabiliser is added to the titanium dioxide as the titanium dioxide is fed to a microniser.

19. A process according to claim 17 in which the polymeric hindered amine stabiliser and the titanium dioxide are mixed in a mixer or tumbler, the polymeric hindered amine stabiliser being added to the titanium dioxide in the form of a solution in a solvent or as a dispersion in water.

20. A process according to claim 17 in which the titanium dioxide in the form of an aqueous slurry is mixed with the polymeric hindered amine stabiliser to form a treated pigment which is separated and dried.

* * * * *